(12) United States Patent
Poulakis

(10) Patent No.: US 12,546,737 B2
(45) Date of Patent: Feb. 10, 2026

(54) MOISTURE SENSOR USING ELECTRICAL CONDUCTIVITY MEASUREMENT

(71) Applicant: Gottlieb Binder GmbH & Co. KG, Holzgerlingen (DE)

(72) Inventor: Konstantinos Poulakis, Hildrizhausen (DE)

(73) Assignee: Gottlieb Binder GmbH & Co. KG, Holzgerlingen (DE)

( * ) Notice: Subject to any disclaimer, the term of this patent is extended or adjusted under 35 U.S.C. 154(b) by 112 days.

(21) Appl. No.: 18/508,421

(22) Filed: Nov. 14, 2023

(65) Prior Publication Data

US 2024/0167975 A1    May 23, 2024

(30) Foreign Application Priority Data

Nov. 18, 2022 (DE) .................. 10 2022 004 262.2

(51) Int. Cl.
*G01N 27/22* (2006.01)

(52) U.S. Cl.
CPC ......... *G01N 27/223* (2013.01); *G01N 27/226* (2013.01)

(58) Field of Classification Search
CPC .. G01N 27/223; G01N 27/226; G01N 27/048; A44B 18/0023
See application file for complete search history.

(56) References Cited

U.S. PATENT DOCUMENTS

| 5,050,434 A | 9/1991 | Demisch |
| 5,739,430 A | 4/1998 | Berberich |
| 7,670,663 B2 | 3/2010 | Poulakis |
| 8,171,755 B2 | 5/2012 | Jahn et al. |
| 10,046,120 B2 | 8/2018 | Heppe et al. |
| 2009/0036013 A1* | 2/2009 | Poulakis ............ A44B 18/0092 442/301 |
| 2009/0326417 A1* | 12/2009 | Ales, III ................ G16H 40/67 600/584 |
| 2013/0066168 A1* | 3/2013 | Yang ....................... G01L 1/146 600/301 |
| 2018/0195218 A1* | 7/2018 | Hamada ................. D04B 27/32 |
| 2021/0219669 A1* | 7/2021 | Kawabata ............. D04B 21/02 |
| 2022/0154389 A1* | 5/2022 | Alexander ............ H02J 7/0063 |

FOREIGN PATENT DOCUMENTS

| DE | 195 19 099 C1 | 8/1996 |
| DE | 10 2009 052 929 A1 | 5/2011 |
| DE | 10 2011 076 219 A1 | 11/2012 |
| DE | 10 2018 210 036 A1 | 12/2019 |
| EP | 0 403 994 B1 | 8/1995 |
| EP | 1 973 440 A2 | 10/2008 |
| EP | 2 547 607 B1 | 5/2014 |
| EP | 3 192 482 A1 | 7/2017 |
| JP | S54-133196 A | 10/1979 |
| WO | 2014/008980 A1 | 1/2014 |

* cited by examiner

*Primary Examiner* — Alvaro E Fortich

(74) *Attorney, Agent, or Firm* — Orbit IP, LLP; Marc G. Martino

(57) ABSTRACT

A sensor device is for determining moisture using an electrical conductivity measurement. A non-conducting support has individual electrical conductors. The electrical resistance between the electrical conductors is dependent upon the amount of moisture present on the support and the electrical conductors. The respective electrical conductor is an integral component of a hook-and-loop fastener part.

22 Claims, 2 Drawing Sheets

MOISTURE SENSOR USING ELECTRICAL CONDUCTIVITY MEASUREMENT

CROSS-REFERENCE TO RELATED APPLICATIONS

This application claims priority to German Patent Application No. DE 10 2022 004 262.2, filed Nov. 18, 2022, the entire contents of which are hereby incorporated in full by this reference.

DESCRIPTION

Field of the Invention

The invention relates to a sensor device for determining moisture using an electrical conductivity measurement, wherein a non-conducting support has individual electrical conductors, and wherein the electrical resistance between the electrical conductors is dependent upon the amount of moisture present on the support and the electrical conductors.

Background of the Invention

EP 0 403 994 B1 discloses a capacitive moisture sensor consisting of a capacitor having at least two metallic layers forming the electrodes, at least one of which layers is steam-permeable, wherein a moisture-sensitive polyimide film is provided as a dielectric between the electrodes.

The change in the capacitance of the moisture sensor known as such, in the presence of air of different moisture content, is based upon the fact that the water molecules in the air diffuse into the polymer film located in the dielectric and thus change the dielectric constant and consequently the capacitance value of the capacitor formed in this way in a measurable manner.

DE 195 19 099 C1 discloses a further moisture sensor, wherein electrodes are applied to a non-conducting support—preferably the windshield of a motor vehicle—and wherein the resistance between the electrodes is dependent upon the amount of moisture located on the support and the electrodes, which consist of conductor tracks of high electrical conductivity which are covered by a resistance layer of low electrical conductivity. With the known moisture sensor, in particular, amounts of moisture that are relevant for controlling windshield wipers can be ascertained in a reliable manner.

SUMMARY OF THE INVENTION

Proceeding from this prior art, the invention is based upon the object of providing a sensor device for determining moisture, which can be used in a wide variety of ways compared to the known solutions. A sensor device having the features of claim 1 achieves an object to this effect in its entirety.

Due to the fact that, according to the characterizing part of claim 1, the respective electrical conductor is an integral component of a hook-and-loop fastener part, a sensor device is created which can be used in a wide variety of ways by virtue of it being able to be applied in almost any manner of again releasable ways, on-site, due to the fastener character of the hook-and-loop fastener part. Such a hook-and-loop fastener part without the respective electrical conductor is usually a component of a fastener means which can be detached almost as often as desired, for which the property rights holders have become known far and wide, both for specialists and consumers alike, under the brand name Kletten®.

The hook-and-loop fastener part with the electrical conductors can preferably be provided with barbs which catch in themselves and can be applied in this way as an independent solution wherever a moisture determination might be desired. Even at locations that are difficult to access, the sensor device with the flexibly designed hook-and-loop fastener part can be applied without commitment and in an again releasable manner. The hook-and-loop fastener part designed to be repositionable in this way can also be designed to be extra thin, as a micro-extruded film fastener with a three-dimensional structure, so that a high degree of flexibility is achieved. Such a hook-and-loop fastener part with the respective elastic conductor also proves to be elastic and is both temperature-resistant and washing-resistant. Depending upon the plastic material used for the non-conducting support, the hook-and-loop fastener part with its respective electrical conductor is also resistant to chemicals.

In a preferred embodiment of the sensor device according to the invention, the hook-and-loop fastener part consists of a base fabric of warp and weft threads, through which passes, at least partially, at least one functional thread, which partially forms the individual fastener elements protruding above the base fabric, and, as a further functional thread, the electrical conductor is woven into the base fabric as well. In addition to such a woven structure for the hook-and-loop fastener part, it can also be obtained, in a knitted embodiment or in an alternative embodiment, as a cast microreplication product, wherein the electrical conductors must then be embedded into the cast, non-conductive support base material in a manner leaving them at least partially exposed. In any case, a flat-shaped, and, in particular, strip-shaped, hook-and-loop fastener part can be realized in a cost-effective manner as a woven fastener component, wherein the electrical conductor is in this respect woven into the base fabric and partially exposed. In this way, large quantities of sensor devices can be continuously obtained, and assembled by cutting out the strip from the length.

In a particularly preferred embodiment of the sensor device according to the invention, it is provided that the one functional thread forms individual loops which are cut open to form hook elements, and the ends thus obtained preferably form a terminal thickening at their heads after a heat treatment. The mentioned terminal thickenings form regular, mushroom-like fastener heads for the hook-and-loop fastener part, which can hook particularly well into a suitable nonwoven or fleece material of another fastener part or with the same hook-and-loop fastener part. The hook-and-loop fastener part can thus have the hook elements with the electrical conductor traces on the one side and, on the other, opposite side, a fleece or loop material with which the hook elements can correspondingly hook. It is also possible to create hooks, and loop-or fleece elements, on one and the same side, in order to form a permanently lockable fastener mechanism in this way.

It is particularly preferably provided that the respective further functional thread be woven into the base fabric as a linear electrical conductor as a warp thread.

Particularly good results can be achieved if the further functional thread of the sensor device consists of a non-rusting, multifilament stainless steel yarn, wherein the non-conductive support or the base fabric of the hook-and-loop fastener part consists of a plastic material, such as polyamide or polyester. The non-conductive yarns of the hook-and-loop fastener part are preferably made of hydrophobic materials, such as polypropylene and/or polyester, and these hydrophobic materials dry more quickly, so that the sensor is accordingly available again quickly for moisture detection.

In a further preferred embodiment of the sensor device according to the invention, it is provided that the further functional threads run parallel in pairs in the hook-and-loop fastener part at a pre-specifiable distance from one another, wherein the hook-and-loop fastener part is preferably designed as a flat, flexible strip, along whose two longitudinal edges in each case the further functional thread, in the form of an electrical conductor, runs over the entire strip length. A defined measurement situation is created in this way, which makes it easier to obtain reproducible measurement results with the sensor device according to the invention for a wide variety of measuring applications.

The electrically conductive further functional threads are preferably firmly bonded on the rear side to a non-conductive polyurethane layer, which preferably adjoins a surface adhesion part which is fixedly connected to this layer and particularly preferably itself forms a releasable hook-and-loop fastener with the fastener elements of the hook-and-loop fastener part. This flat hook-and-loop fastener part can be a so-called velour, which can be brought into engagement with the mushroom-shaped fastener elements of the base fabric when required. The non-conducting layers are of importance, since it is then ensured that no short-circuit occurs when the hook-and-loop fastener part with its integrally received conductors comes into contact with metallic components, such as a metal tube, which is usually the case when the sensor device is attached to such metallic components to detect moisture.

In order to read the sensor values, it is preferably provided that electrical contacting points be applied or incorporated into the strip-like hook-and-loop fastener part, in which the respective further functional thread in the form of the electrical conductor ends. In this way, a particularly space-saving measurement value tap point is achieved on the hook-and-loop fastener part. The contacting points can be solder joints or preferably consist of plug-socket solutions.

In a further particularly preferred embodiment of the sensor device according to the invention, it is provided that an evaluation device for the measurement data be connected to the respective further functional thread, i.e., to the electrical conductor. In addition to a capacitive measurement data evaluation, as presented at the outset in the prior art, the possibility also exists, with the aid of a voltage source, to send electrical current through an electrical conductor of the sensor device and, with the aid of a display device which is connected to both electrical conductors, to determine the measure of the flowing electrical current, which is then a measure of the respective moisture present on the otherwise non-conducting support due to the moisture of the surrounding atmosphere. In this respect, an electrical resistance measurement is realized, and the higher the moisture, the lower the electrical resistance, and the higher are the measured values displayed on the display device.

The invention also relates to a hook-and-loop fastener part—in particular, as part of a sensor device as presented above—having non-conductive functional threads which form individual fastener elements and protrude from a non-conductive base fabric and having electrically conductive further functional threads as an integral part of this base fabric. In this way, a hook-and-loop fastener part can be coupled, as a base component, later on-site with a plurality of different sensor evaluation devices. There is nothing in the prior art that corresponds to this.

BRIEF DESCRIPTION OF THE DRAWINGS

The sensor device according to the invention is explained in more detail below with reference to an exemplary embodiment according to the drawing. In the drawings, which are schematic representations that are not to scale.

DETAILED DESCRIPTION OF EMBODIMENTS OF THE INVENTION

Figure 1:
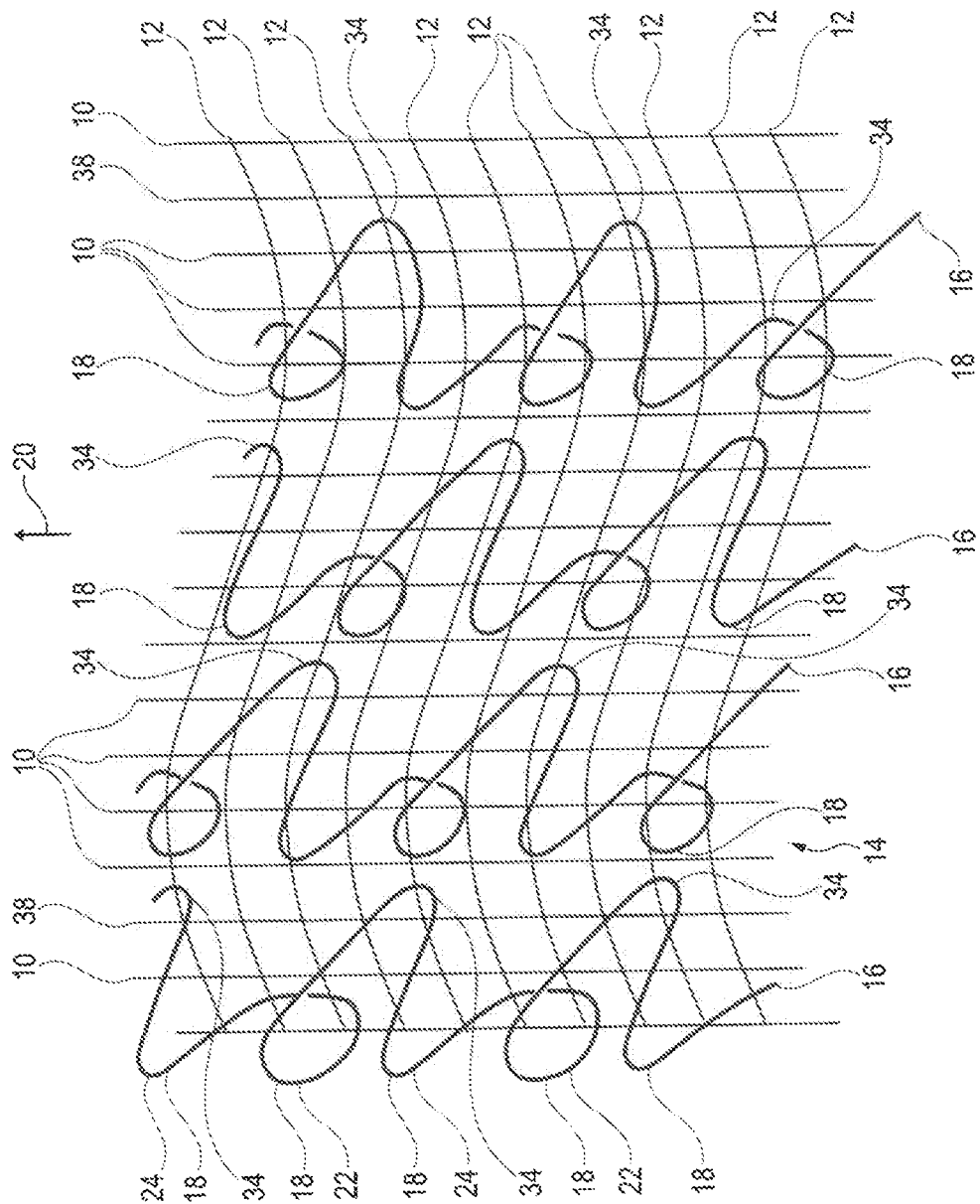
FIG. 1 shows the weave structure of the sensor device, with incorporated electrical conductors.
Figure 3:
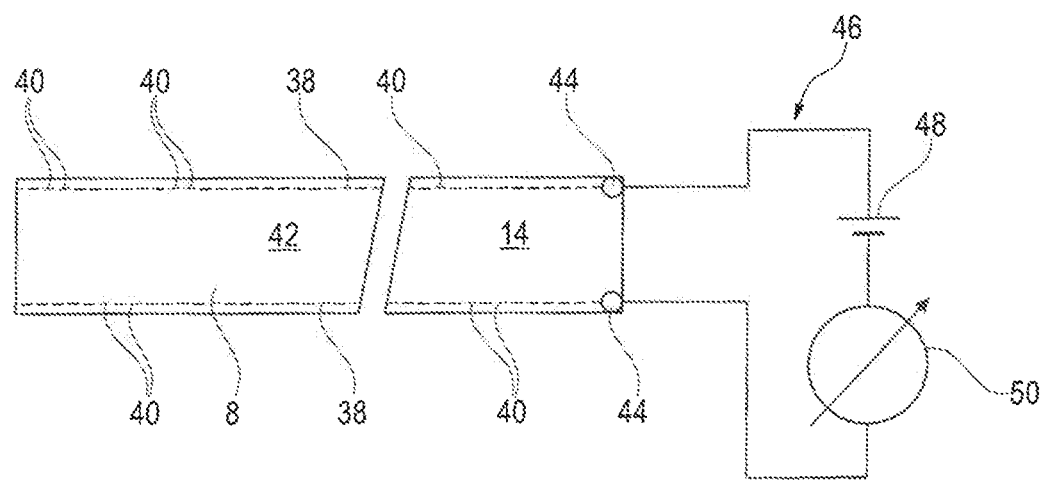
FIG. 3 is a highly simplified plan view of portions of a strip-shaped sensor device, with a connected evaluation device.

FIG. 1 shows a detail of a plan view of a flat hook-and-loop fastener part, denoted by 8 in FIG. 3, as a base component for the sensor device according to the invention. This hook-and-loop fastener part 8 can be lengthened in any way within the image plane both in one and in the other image direction, and the geometric dimensions of the flat material are dependent upon the specifications of the weaving device on which the hook-and-loop fastener part is produced.

The hook-and-loop fastener part 8 consists of warp threads 10 and weft threads 12, which, woven together at right angles, form the base fabric 14 for the hook-and-loop fastener part 8. Furthermore, the base fabric 14 is designed with functional threads 16 in the manner of pile threads, and the respective functional thread 16 forms the individual fastener elements 18 for the flat hook-and-loop fastener part. Furthermore, the production direction for the hook-and-loop fastener part 8 in the context of the weaving production is reproduced on its upper side, as seen in the direction of view of FIG. 1 with an arrow 20.

In the shown arrangement according to FIG. 1, the respective weft threads 12 are designed in the manner of a sine or cosine wave, and, at the points of intersection between warp threads 10 and weft threads 12, the warp threads 10 run parallel to the production direction 20 and parallel to one another in a straight arrangement. The wave-shaped or arcuate design of the weft threads 12 creates a defined mechanical resistance, which counteracts a possible disengagement movement of the respective fastener elements. However, it is self-evident that the mentioned weft threads 12 can also run in a straight line parallel to one another, and this embodiment forms the basis for the strip-shaped sensor device according to FIG. 3. The respective functional thread 16 extends at least partially between two adjacent warp threads 10 in the base fabric 14, wherein, in the row shown in FIG. 1, each fourth weft thread 12 passes above, and the other weft threads 12 pass below. At the location of each drop of the base fabric 14, the functional thread 16 forms an associated loop 22 located above, wherein a further loop 24 is subsequently formed immediately after, so that a type of V-bonding results therefrom. However, other types of weave are also conceivable in this case, for example, the integration of the functional thread 16 in a W-shaped manner or the like.

The named loops 22, 24 form the fastener elements 18, and the loops 22, 24 remain closed as shown in FIG. 1; in this way, a type of fleece hook-and-loop fastener part is created. To obtain hook or mushroom-like fastener elements 28, the loops 22, 24 are cut open on the side, in a ratio of about one-third to two-thirds, so that a fastener hook 30 is then produced, and, with the upper side 32 of the base fabric 14 being transferred to the underside 26 of the strip 8, the locking hooks 30 can come into releasable engagement with lower loop elements 34 of an additionally attached velour 35, which is firmly connected to the base fabric 14 via an adhesive layer 52, on the underside thereof, which preferably consists of polyurethane. The adhesive layer 52 partially comprises the contact conductors 38 from the rear side and, in this respect, forms an electrical insulation layer towards the velour 35. In this case, the respective conductor 38 remains free towards the top, however, in order to be able to detect moisture. If the mentioned separating or cutting process for the individual loops 22, 24 is carried out thermally, and in particular, the free loop ends then continue to be heated, the ends shrink back and thereby form mushroom-like fastener heads 36, due to the surface tension of the plastic material, which protrude beyond an associated stem part 37 on all sides. It is also possible in this way to generate combined fasteners on the upper side 32, i.e., having hook and loop-shaped elements on the same side of the base fabric 14, which enables adhesion with correspondingly designed loop and hook elements of a further hook-and-loop fastener part of a Kletten® hook-and-loop fastener part (not shown). For this purpose, all loops 22, 24 are then not cut open to form hooks or mushroom heads but remain as loop-shaped engagement material.

As can also be seen from FIG. 1, in addition to the one functional thread 16 in the form of the individual loops 22, 24, the further functional threads 38 in the form of electrical conductors are introduced as warp threads, which, in a manner comparable to the warp threads 10, run parallel to these along the other base fabric 14, wherein the further, electrically-conductive functional thread 38 in each case alternately passes over or under the respective weft threads 12 and is thus anchored fixedly in the base fabric 14.

Figure 2:
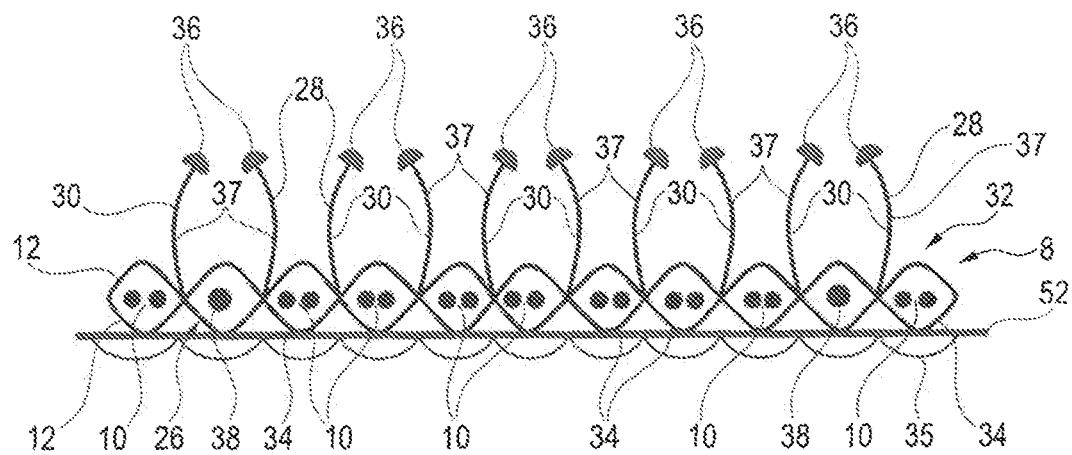
FIG. 2 is a side view of the flat hook-and-loop fastener part according to FIG. 1.

As shown, in particular, in the representation according to FIG. 2, a single warp thread 10 can also consist of a warp thread pair, or otherwise be multi-strand. This also applies to the weft threads 12 which, according to the cross-sectional representation according to FIG. 2, pass in an alternating sequence over or under each pair of warp threads 10. The respective functional or pile thread 16 overlaps the two subsequent weft thread pairs 12 in the row shown, and in each case an electrical conductor as the further functional thread 38, with the omission of each weft thread pair 12.

The base fabric 14 of FIG. 1, which is assembled in the form of the strip 8 according to the representation according to FIG. 3, accordingly has, along its two longitudinal edges, the further functional thread 38 adjacent thereto, which has exposed points 40 which are more or less embedded in the base fabric 14, exposed to the surroundings, which can be brought into contact with moisture which can be deposited on the accordingly flexible, non-conductive strip 42. Since the strip 42 cannot be reproduced in its entire length, it is shown in an interrupted manner in the illustration according to FIG. 3. As can also be seen from FIG. 3, the free ends of the respective further functional thread 38 end in a contacting point 44 to which an evaluation device is connected. Instead of contacting by means of solder joints, the contacting points 44 can also consist of a socket part into which the evaluation device can be inserted by means of an associated plug (not shown).

With the aid of a voltage source 48 in the form of a direct current battery, electrical current is sent through the sensor device according to FIG. 3 via its respective electrical conductor as the further functional threads 38, and, with the aid of a display device 50, the measure of the flowing electrical current is determined, which is also a measure of the respective moisture which is distributed from the surrounding atmosphere on the strip 42 along with its electrical conductors 38 arranged in pairs relative to one another.

The strip-shaped sensor device according to FIG. 3 can also be used without an evaluation unit 46, and can be connected, for example, to a controller of a conventional domestic washing machine, and, in the case of an attached sensor device on the underside of this washing machine, an undesired escape of moisture can be detected underneath, and the machine or its water inlet can be halted. For this moisture detection, it has proven advantageous to design the further functional threads 38 to be electrically conductive, for example, by using galvanized copper wires, such as are usually used for conducting current.

Since the strip 42 is extremely flexible and can be looped back onto itself and fixed in a releasable manner on other components of almost any design, another preferred application would be if such a strip 42 were to comprise a sleeve connection in pipelines in order to be able to detect a possible water escape in the region of the sleeve connection. If this is then used as an evaluation device, which allows a wireless measured value transmission, a central location can be used to monitor moisture, and, in the process, to monitor several such strips 42.

Due to the special fabric design for the base fabric 14, it is also ensured that, during operation with the sensor device, the open fabric structure of the strip 42 cannot be saturated with water vapor, which could greatly reduce the measurement sensitivity. Rather, due to the open fabric structure, drying always occurs, and the sensor is regenerated in this respect and available without measurement error for repeated moisture measurements. The fiber material can also be at least partially hydrophobic or coated, so that, even in this respect, residual moisture harmful for the measurement is removed.

It goes without saying that the sensor device presented above is only one possible embodiment of a plurality of designs. It would thus be conceivable to combine several different fabrics with one another, so that a wide variety of types of fabric upper sides 32 and fabric undersides 26 can result. Furthermore, it is also possible to obtain the hook-and-loop fastener part in a casting process (chill-rolling process) as a microreplication part, and to incorporate the electrical conductors, at least partially exposed, as the further functional threads 38 into the cast compound.

Since the strip solution according to FIG. 3 can be assembled in virtually any length, it is also possible not to individualize the strip as a sales product for a special use, and the respective consumer can then freely decide, according to their own desires, the specific use for the sensor device. There is nothing in the prior art that corresponds to this.

What is claimed is:

1. A sensor device configured for determining moisture using an electrical conductivity measurement, comprising:
   a non-conducting support which has individual electrical conductors; and
   wherein an electrical resistance between the individual electrical conductors is dependent upon an amount of moisture present on the support and the individual electrical conductors;
   wherein a respective electrical conductor is an integral component of a hook-and-loop fastener part;

wherein the hook-and-loop fastener part is made of a base fabric, made of warp and weft threads, through which passes, at least partially, at least one functional thread which partially forms fastener elements protruding above the base fabric, and in that the respective electrical conductor is woven into the base fabric as a respective further functional thread.

2. The sensor device according to claim 1, including fastener hooks, wherein the fastener hooks are designed such that loops of the at least one functional thread are cut open on the side, in a ratio of one-third to two-thirds, wherein fastener heads are formed on the free loop ends and are formed by the separation of the loops being carried out thermally and the free loop ends continuing to be heated.

3. The sensor device according to claim 2, wherein the respective further functional thread is woven into the base fabric as a warp thread.

4. The sensor device according to claim 3, wherein the respective further functional thread consists of a non-rusting, multifilament stainless steel yarn.

5. The sensor device according to claim 4, wherein the respective further functional threads runs parallel in associated pairs at a pre-specifiable distance from one another in the hook-and-loop fastener part.

6. The sensor device according to claim 5, wherein the hook-and-loop fastener part is designed as a flat, flexible strip, along whose two longitudinal edges the further functional thread runs over the entire strip length.

7. The sensor device according to claim 6, wherein the electrically conductive respective further functional thread is firmly bonded on a rear side to a non-conductive polyurethane layer, which adjoins a surface adhesion part, which is fixedly connected to this layer.

8. The sensor device according to claim 7, wherein the surface adhesion part forms an again releasable hook-and-loop fastener with the fastener elements of the hook-and-loop fastener part.

9. The sensor device according to claim 7, wherein electrical contacting points are applied or incorporated into the strip-like hook-and-loop fastener part, in which the respective further functional thread ends.

10. The sensor device according to claim 8, wherein an evaluation device for the measurement data is connected to the respective further functional thread.

11. The hook-and loop fastener part as part of the sensor device according to claim 1 has the non-conductive at least one functional thread which form individual fastener elements protruding from the base fabric, and has the electrically conductive respective further functional threads as an integral component of the base fabric.

12. The sensor device according to claim 1, including fastener hooks, wherein the fastener hooks are designed such that loops of the at least one functional thread are cut open on the side, in a ratio of one-third to two-thirds, wherein fastener heads are formed on the free loop ends and are formed by the separation of the loops being carried out thermally and the free loop ends continuing to be heated.

13. The sensor device according to claim 1, wherein the respective further functional thread is woven into the base fabric as a warp thread.

14. The sensor device according to claim 1, wherein the respective further functional thread consists of a non-rusting, multifilament stainless steel yarn.

15. The sensor device according to claim 1, wherein the respective further functional threads runs parallel in associated pairs at a pre-specifiable distance from one another in the hook-and-loop fastener part.

16. The sensor device according to claim 1, wherein the hook-and-loop fastener part is designed as a flat, flexible strip, along whose two longitudinal edges the respective further functional thread runs over the entire strip length.

17. The sensor device according to claim 1, wherein the electrically conductive respective further functional thread is firmly bonded on a rear side to a non-conductive polyurethane layer, which adjoins a surface adhesion part, which is fixedly connected to this layer.

18. The sensor device according to claim 1, wherein the surface adhesion part forms an again releasable hook-and-loop fastener with the fastener elements of the hook-and-loop fastener part.

19. The sensor device according to claim 1, wherein electrical contacting points are applied or incorporated into the strip-like hook-and-loop fastener part, in which the respective further functional thread ends.

20. The sensor device according to claim 1, wherein an evaluation device for the measurement data is connected to the respective further functional thread.

21. A sensor device configured for determining moisture using an electrical conductivity measurement, comprising:
a non-conducting support which has individual electrical conductors; and
wherein an electrical resistance between the individual electrical conductors is dependent upon an amount of moisture present on the support and the individual electrical conductors;
wherein a respective electrical conductor is an integral component of a hook-and-loop fastener part;
wherein the hook-and loop fastener part has non-conductive functional threads which form individual fastener elements protruding from a base fabric, and has electrically conductive further functional threads as an integral component of the base fabric;
wherein the further functional threads are the individual electrical conductors.

22. A sensor device configured for determining moisture using an electrical conductivity measurement, comprising:
a non-conducting support which has individual electrical conductors;
wherein an electrical resistance between the individual electrical conductors is dependent upon an amount of moisture present on the support and the individual electrical conductors;
wherein a respective electrical conductor of the individual electrical conductors is an integral component of a hook-and-loop fastener part; and
fastener hooks, wherein the fastener hooks are formed from protruding loops of a functional thread integrated into the non-conductive support that are cut open on the side forming free loop ends, in a ratio of one-third to two-thirds, wherein fastener heads are formed on the cut free loop ends and are formed by the separation of the loops being carried out thermally and the free loop ends continuing to be heated.

* * * * *